United States Patent
Keller et al.

(10) Patent No.: US 9,426,715 B1
(45) Date of Patent: Aug. 23, 2016

(54) NEIGHBOR ACCESS NODE DETERMINATION

(71) Applicant: Sprint Spectrum LP, Overland Park, KS (US)

(72) Inventors: Greg Keller, Sterling, VA (US); Yun Sung Kim, Ashburn, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 99 days.

(21) Appl. No.: 14/201,727

(22) Filed: Mar. 7, 2014

(51) Int. Cl.
  *H04W 36/30* (2009.01)
  *H04W 24/06* (2009.01)

(52) U.S. Cl.
  CPC .............. *H04W 36/30* (2013.01); *H04W 24/06* (2013.01)

(58) Field of Classification Search
  CPC ............................... H04W 36/30; H04W 24/06
  See application file for complete search history.

(56) References Cited

U.S. PATENT DOCUMENTS

| | | |
|---|---|---|
| 8,107,950 B2 | 1/2012 | Amirijoo et al. |
| 2010/0120394 A1* | 5/2010 | Mia et al. .................... 455/404.2 |
| 2010/0227603 A1 | 9/2010 | Gupta et al. |
| 2011/0028181 A1 | 2/2011 | Byum et al. |
| 2011/0269467 A1* | 11/2011 | Leclerc et al. ................ 455/436 |
| 2012/0094675 A1* | 4/2012 | Godin ............................ 455/438 |
| 2013/0005350 A1* | 1/2013 | Campos et al. ............ 455/456.1 |
| 2013/0012188 A1 | 1/2013 | Gao et al. |
| 2013/0273878 A1 | 10/2013 | Heo et al. |
| 2014/0242998 A1* | 8/2014 | Oh et al. ....................... 455/444 |

* cited by examiner

*Primary Examiner* — Brian D Nguyen (57) ABSTRACT

A first access node receives from a wireless device in communication with the first access node an identifier of a second access node detected by the wireless device. It is determined that a communication link has not previously been established between the first access node and the second access node based on the identifier. The wireless device is instructed to provide a signal level of a signal from the second access node, and when the signal level of the second access node signal meets a criteria, a communication link is established between the first access node and the second access node.

14 Claims, 6 Drawing Sheets

NEIGHBOR ACCESS NODE DETERMINATION

TECHNICAL BACKGROUND

To enable wireless device mobility, access nodes in communication with a wireless device are configured to perform a handover of the wireless device to another access node. Some access nodes can be further configured to maintain an indication of proximate access nodes, such as a neighbor relation table or another similar indication, and the indication of proximate access nodes can be used to facilitate a wireless device handover. Configuring the indication of proximate access nodes is typically performed manually by a network provider for each access node deployed in a communication system. Further, the presence of invalid entries, such as a false indication that an access node is capable of supporting a handover from another access node, can degrade network performance by causing interrupted communication sessions and failed handover attempts.

OVERVIEW

In operation, an identifier is received from a wireless device in communication with a first access node, where the identifier is associated with a second access node which is detected by the wireless device. It is determined that a communication link has not previously been established between the first access node and the second access node based on the identifier. The wireless device is then instructed to provide a signal level of a signal from the second access node. When the signal level of the second access node signal meets a criteria, the communication link is established between the first access node and the second access node. In an embodiment, a handover of the wireless device from the first access node to the second access node is prevented before it is determined that the signal level of the second access node signal meets the criteria. Additionally, or alternatively, the performance of the handover of the wireless device from the first access node to the second access node is enabled when the communication link is established between the first access node and the second access node.

DETAILED DESCRIPTION

Figure 1:
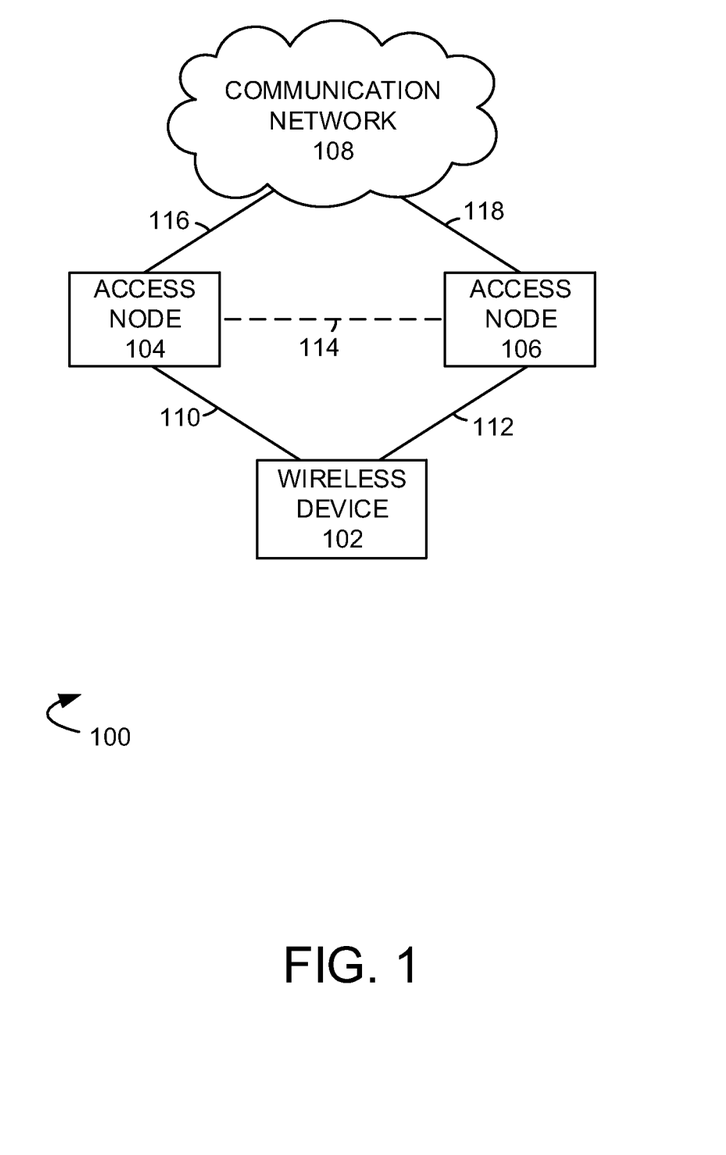
FIG. 1 illustrates an exemplary communication system for neighbor access node determination.

FIG. 1 illustrates an exemplary communication system 100 for neighbor access node determination comprising wireless device 102, access node 104, access node 106, and communication network 108. Examples of wireless device 102 can comprise a cell phone, a smart phone, a computing platform such as a laptop, palmtop, or tablet, a personal digital assistant, or an internet access device, including combinations thereof. Wireless device 102 can communicate with access node 104 over communication link 110, and with access node 106 over communication link 112.

Access nodes 104 and 106 are each is a network node capable of providing wireless communications to wireless device 102, and can comprise, for example, a base transceiver station, a radio base station, an eNodeB device, or an enhanced eNodeB device. Access nodes 104 and 106 can comprise a larger access node, such as a macro node, or they can comprise a smaller access node, such as a micro node, a pico node, a femto node, and the like. Varying size access nodes can be characterized by available transmission power, frequency bands supported, coverage areas of the frequency bands, and number of simultaneous connections supported, among other things. A first access node (e.g., access node 104) can comprise a first coverage area, and a second access node (e.g., access node 106) can comprise a second coverage area, at least a portion of which overlaps the first coverage area. Access node 104 is in communication with communication network 108 over communication link 116, and access node 106 is in communication with communication network 108 over communication link 118. Access nodes 104 and 106 can also communicate with each other over communication link 114, which may be established between access nodes 104 and 106, as further described below.

Communication network 108 can comprise a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 108 can be capable of carrying voice information and other data, for example, to support communications by a wireless device such as wireless device 102. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). Wired network protocols that may be utilized by communication network 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 108 may also comprise a wireless network, including base stations, wireless communication nodes, telephony switches, internet routers, network gateways, computer systems, communication links, or some other type of communication equipment, and combinations thereof.

Communication links 110, 112, 114, 116 and 118 can comprise wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 104, access node 106, and communication network 108 which are omitted for clarity, including additional processing nodes, routers, gateways, and physical and/or wireless data links for carrying data among the various network elements.

Manual configuration of access nodes during deployment or network development, such as configuring relationships with proximate access nodes, is labor intensive and is typically performed by a network provider for each access node deployed in a communication system. The presence of invalid neighbor relations, such as a false indication that a proximate access node is capable of supporting a handover, can degrade network performance by causing interrupted communication sessions or failed handover attempts.

Automated configuration of relationships with proximate access nodes can also result in the presence of invalid neighbor relations. For example, during a period of rapid network development or deployment during which new access nodes are deployed, an access node may be detected as proximate or as a neighbor of another access node which, after full network deployment, may in fact be too distant, or which may have other access nodes ultimately interposed between them. Invalid neighbor relations can also be caused by environmental factors, such as a seasonal change in foliage which alters signal reception, or the nearby presence of a large body of water, which can reflect distant signals from access nodes which are not actually proximate. Additional evaluation of detected neighbors can reduce the establishment of invalid neighbor relations, which can increase network efficiency and improve overall network performance during a period of access node deployment.

In operation, from wireless device 102 in communication with first access node 104, an identifier of second access node 106 which has been detected by wireless device 102 is received. It is determined that a communication link (e.g., communication link 114) has not previously been established between first access node 104 and second access node 106 based on the identifier. The wireless device is instructed to provide a signal level of a signal from the second access node, and when the signal level of the second access node signal meets a criteria, the communication link is established between the first access node and the second access node. In an embodiment, the performance of a handover of the wireless device from the first access node to the second access node can be prevented before it is determined that the signal level of the second access node signal meets the criteria. Further, the performance of the handover from the first access node to the second access node can be enabled when the communication link is established between the first access node and the second access node.

Figure 2:
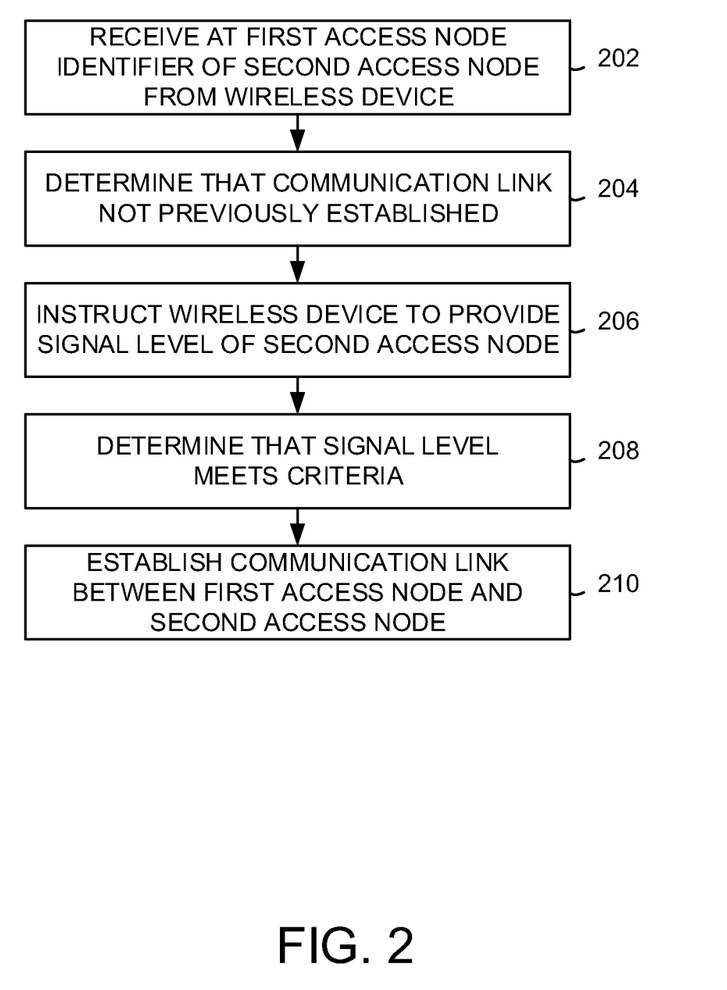
FIG. 2 illustrates an exemplary method of neighbor access node determination.

FIG. 2 illustrates an exemplary method of neighbor access node determination. In operation 202, at a first access node, an identifier of a second access node is received from a wireless device, where the second access node is detected by the wireless device. For example, wireless device 102 can establish a communication session with access node 104. As another example, wireless device 102 can be in a low power state, an idle state, and the like, in which wireless device 102 is not involved in an active communication session, and wireless device 102 can be located in a coverage area of access node 104. Wireless device 102 can provide an indication to access node 104 that wireless device 102 has detected a second access node, such as access node 106. The indication can comprise an identifier of the second access node, such as a physical cell identifier (PCI), a cell global identity (CGI), a E-UTRAN cell global identity (ECGI), and the like.

It can be determined that a communication link has not been previously established between the first access node and the second access node based on the identifier (operation 204). For example, access node 104 can use the identifier of access node 106 to determine whether communication link 114 has been established. Access node 104 can send a request to a network element of communication network 108, such as a mobility management entity (MME) or another element of communication network 108, to make the determination. Additionally, or alternatively, access node 104 can use an indication of existing communication links with other access nodes, such as a neighbor relation table or a similar indication, to make the determination.

The wireless device is then instructed to provide a signal level of a signal from the second access node (operation 206). For example, wireless device 102 can be instructed to provide access node 104 with a signal level of a signal from access node 106. The signal level can comprise an indication of signal strength, such as a reference signal receive power (RSRP), a received signal strength indication (RSSI), a signal-to-noise ratio (SNR), a carrier to noise ratio (CNR) value, a signal noise and distortion (SINAD), a signal to interference (SII), a signal to noise plus interference (SNIR), a signal to quantization noise ratio (SQNR), and the like. The signal level can further comprise an indication of signal quality, such as a reference signal receive quality (RSRQ), a channel quality indicator (CQI), or another measurement of signal quality. The signal of access node 106 can comprise a reference signal, a pilot signal, a bearer signal, or some other signal, including combinations of the foregoing.

When the signal level of the second access node signal meets a criteria, the communication link is established between the first access node and the second access node (operation 210). The criteria can comprise a signal level threshold, such as a minimum signal strength indication, signal quality indication, or some combination thereof. When the signal level of the signal from access node 106, which is reported to access node 104 by wireless device 102, meets the criteria, communication link 114 can be established between access nodes 104 and 106. An indication of the new communication link can also be stored at access node 104, access node 106, and or another network element of communication system 100.

Figure 3:
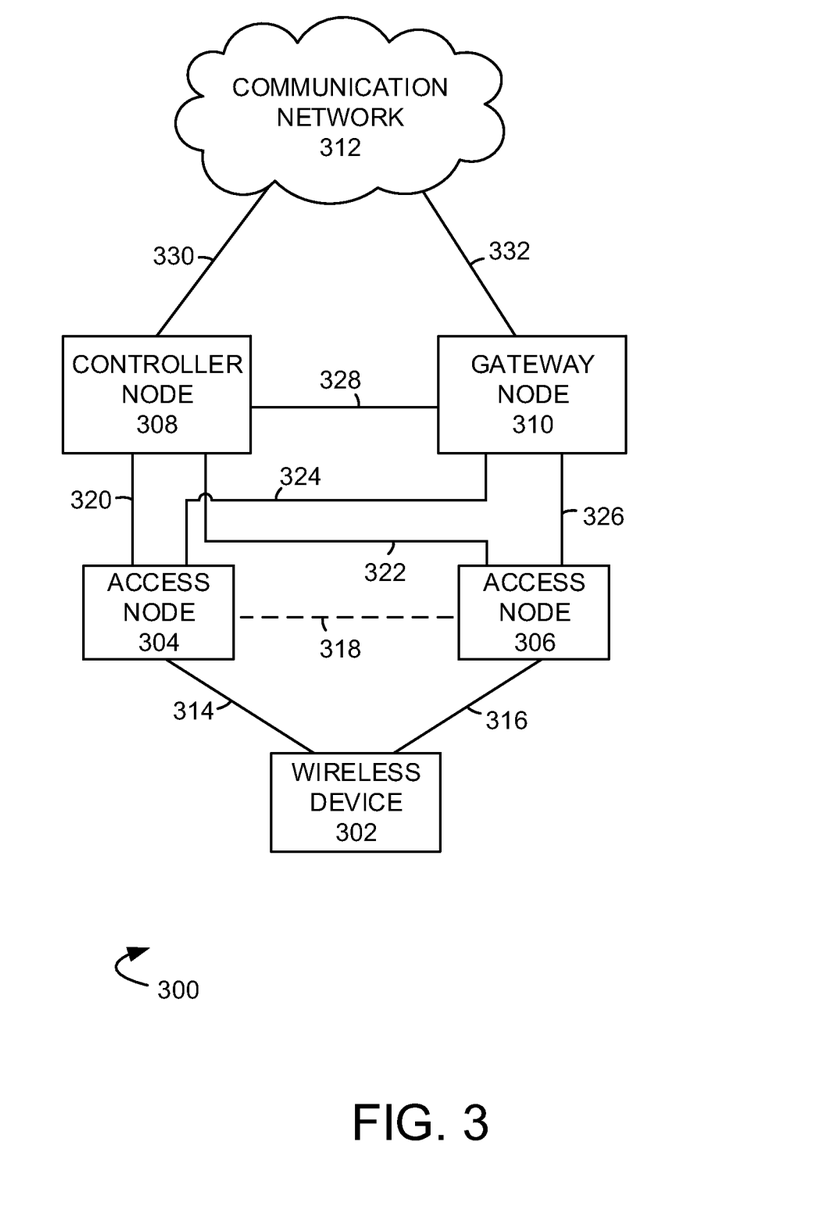
FIG. 3 illustrates another exemplary communication system for neighbor access node determination.

FIG. 3 illustrates an exemplary communication system 300 for neighbor access node determination comprising wireless device 302, access node 304, access node 306, controller node 308, gateway node 310, and communication network 312. Examples of wireless device 302 can comprise a cell phone, a smart phone, a computing platform such as a laptop, palmtop, or tablet, a personal digital assistant, or an internet access device, including combinations thereof. Wireless device 302 can communicate with access node 304 over communication link 314, and with access node 306 over communication link 316.

Access nodes 304 and 306 are each is a network node capable of providing wireless communications to wireless device 302, and can comprise, for example, a base transceiver station, a radio base station, an eNodeB device, or an enhanced eNodeB device. Access nodes 304 and 306 can comprise a larger access node, such as a macro node, or they can comprise a smaller access node, such as a micro node, a pico node, a femto node, and the like. Varying size access nodes can be characterized by available transmission power, frequency bands supported, coverage areas of the frequency bands, and number of simultaneous connections supported, among other things. A first access node (e.g., access node 304) can comprise a first coverage area, and a second access node (e.g., access node 306) can comprise a second coverage area, at least a portion of which overlaps the first coverage area. Access node 304 is in communication with controller node 308 over communication link 320 and with gateway node 310 over communication link 324. Access node 306 is in communication with controller node 308 over communication link 322 and with gateway node 310 over communication link 326. Access nodes 304 and 306 can also communicate with each other over communication link 318, which may be established between access nodes 304 and 306, as further described below.

Controller node 308 can comprise a processor and associated circuitry to execute or direct the execution of computer-readable instructions, and can be configured to control the setup and maintenance of a communication session over communication network 312 for wireless device 302, as well as to determine neighbor access nodes of an access node. Controller node 308 can comprise a mobile switching center (MSC), a dispatch call controller (DCC), a mobility management entity (MME), or another similar network node. Controller node 308 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Controller node 308 can receive instructions and other input at a user interface. Controller node 308 is in communication with communication network 312 over communication link 330, and with gateway node 310 over communication link 328.

Gateway node 310 can comprise a processor and associated circuitry to execute or direct the execution of computer-readable instructions, and can be configured to determine neighbor access nodes of an access node. Gateway node 310 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 310 can receive instructions and other input at a user interface. Examples of gateway node 310 can include a standalone computing device, a computer system, or a network component, such as an access service network gateway (ASN-GW), a packet data network gateway (P-GW), a serving gateway (S-GW), a mobile switching controller (MSC), a packet data serving node (PDSN), call processing equipment, a home agent, a radio node controller (RNC), a subscriber profile system (SPS), authentication, authorization, and accounting (AAA) equipment, and a network gateway, including combinations thereof. Gateway node 310 is in communication network 312 over communication link 332.

Communication network 312 can comprise a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 108 can be capable of carrying voice information and other data, for example, to support communications by a wireless device such as wireless device 302. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). Wired network protocols that may be utilized by communication network 312 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 312 may also comprise a wireless network, including base stations, wireless communication nodes, telephony switches, internet routers, network gateways, computer systems, communication links, or some other type of communication equipment, and combinations thereof.

Communication links 314, 316, 318, 320, 322, 324, 326, 328, 330, and 332 can comprise wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 300 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access nodes 304 and 306, controller node 308, gateway node 310, and communication network 312 which are omitted for clarity, including additional processing nodes, routers, gateways, and physical and/or wireless data links for carrying data among the various network elements.

Figure 4:
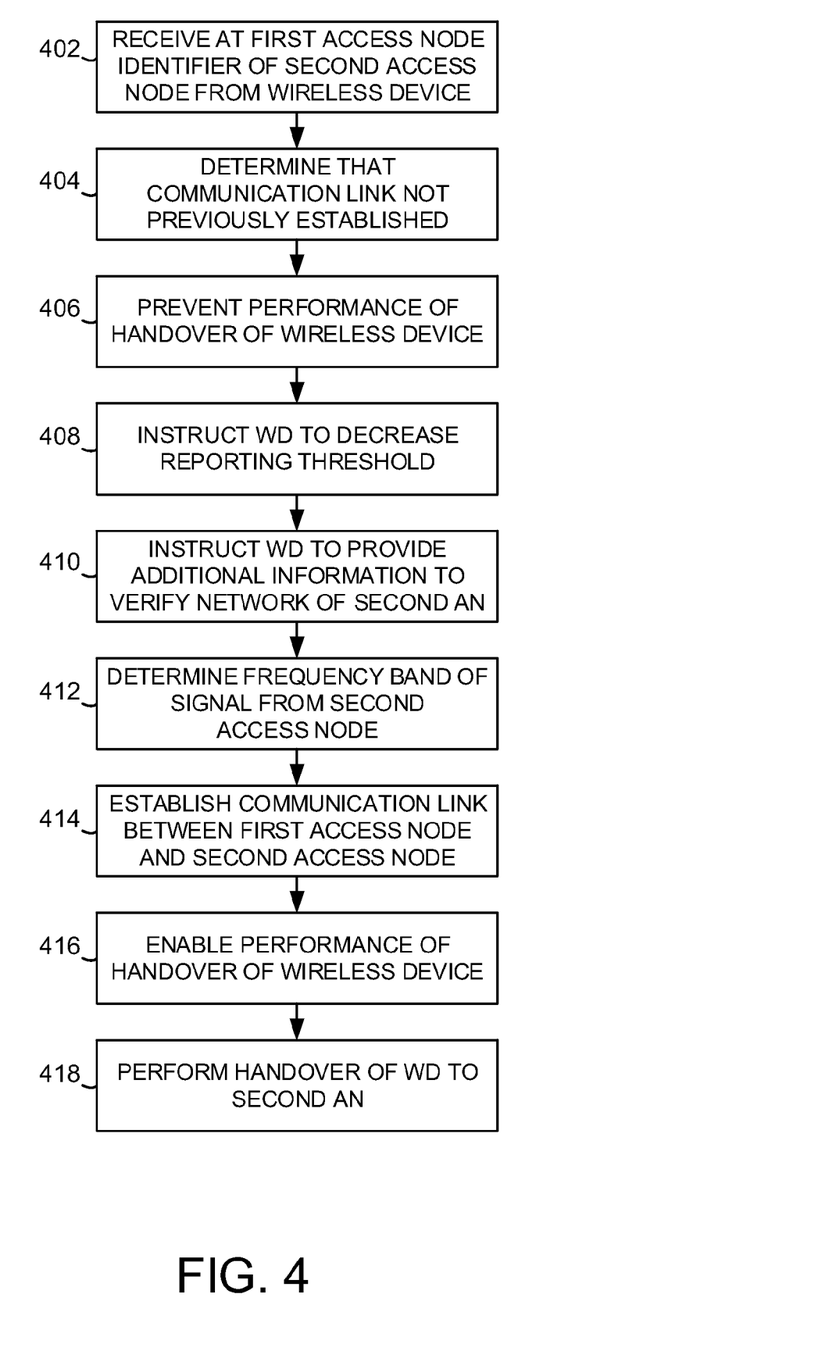
FIG. 4 illustrates another exemplary method of neighbor access node determination.

FIG. 4 illustrates another exemplary method of neighbor access node determination. In operation 402, at a first access node, an identifier of a second access node is received from a wireless device, where the second access node is detected by the wireless device. For example, wireless device 302 can establish a communication session with access node 304. As another example, wireless device 302 can be in a low power state, an idle state, and the like, in which wireless device 302 is not involved in an active communication session, and wireless device 302 can be located in a coverage area of access node 304. Wireless device 302 can provide an indication to access node 304 that wireless device 302 has detected a second access node, such as access node 306. The indication can comprise an identifier of the second access node, such as a physical cell identifier (PCI), a cell global identity (CGI), a E-UTRAN cell global identity (ECGI), and the like.

It can be determined that a communication link has not been previously established between the first access node and the second access node based on the identifier (operation 404). For example, access node 304 can use the identifier of access node 306 to determine whether communication link 318 has been established. Access node 304 can send a request to a network element of communication network 308, such as controller node 308, gateway node 310, or another element of communication network 312, to make the determination.

Additionally, or alternatively, access node 304 can use an indication of existing communication links with other access nodes, such as a neighbor relation table or a similar indication, to make the determination.

When it the communication link has not been established between the first and second access nodes, a handover of wireless device 302 from access node 304 to access node 306 is prevented (operation 406). For example, wireless device 302 can be instructed not to request the performance of a handover when the communication link has not been established. The instruction can be provided by access node 304, controller node 308, gateway node 310, or another network element of communication system 300. Additionally, or alternatively, access node 304, controller node 308, and/or gateway node 310 can prevent the performance of the handover. In operation, the performance of the handover of the wireless device from the first access node to the second access node can be prevented before it is determined that a signal level of the second access node signal meets a criteria, as further described below.

Then the wireless device is instructed to decrease a reporting threshold (operation 408). The reporting threshold can comprise a signal level of a signal from the second access node (e.g., access node 306). The signal level can comprise an indication of signal strength, such as a reference signal receive power (RSRP), a received signal strength indication (RSSI), a signal-to-noise ratio (SNR), a carrier to noise ratio (CNR) value, a signal noise and distortion (SINAD), a signal to interference (SII), a signal to noise plus interference (SNIR), a signal to quantization noise ratio (SQNR), and the like. The signal level can further comprise an indication of signal quality, such as a reference signal receive quality (RSRQ), a channel quality indicator (CQI), or another measurement of signal quality. The signal of access node 306 can comprise a reference signal, a pilot signal, a bearer signal, or some other signal, including combinations of the foregoing. In an embodiment, wireless device 302 can be instructed by access node 304 using a connection reconfiguration message to decrease the reporting threshold. When the signal level of the signal from access node 306 meets the decreased reporting threshold, access node 304 can receive from wireless device 304 additional information about the second access node.

The wireless device can then be instructed to provide additional information about the second access node to verify that the second access node is associated with a network provider of the first access node and to provide the signal level of the signal from the second access node (operation 410). The additional information from the second access node (e.g., access node 306) can comprise an identifier of the second access node, a frequency band of the signal, and/or additional information about the second access node, to verify that the second access node is associated with a network provider of the first access node (e.g., access node 304), as well as the signal level of the signal from the second access node. The identifier of access node 306 can comprise a physical cell identifier (PCI), a cell global identity (CGI), a E-UTRAN cell global identity (ECGI), and the like. When it is determined that access node 306 is not associated with the network provider of access node 304, access node 306 can be determined to not be a valid neighbor of access node 304, and an indication of this determination can be stored at access node 304, controller node 308, and/or gateway node 310.

In an embodiment, the additional information about the second access node can be received from the wireless device in a handover request. That is, additional information about the second access node can be received from wireless device 302 in separate messages, or in some combination of messages. In an embodiment, a handover request can be received from wireless device 302, and the handover request can comprise the signal level of the second access node and the information about the second access node to verify that the second access node is associated with the network provider of the first access node.

When it is determined that access node 306 is associated with the network provider of access node 304, a frequency band of the signal from the second access node can be determined, and the criteria can be adjusted based on the determined frequency band (operation 412). The frequency band can be determined, for example, based on the additional information from the second access node. The criteria can comprise a signal level threshold, such as a minimum signal strength indication, signal quality indication, or some combination thereof. Access node 306 can provide wireless communications over a plurality of frequency bands, for example, 800 MHz, 1.9 GHz, 2.5 GHz, and the like. Each frequency band can comprise different coverage areas, structure penetration characteristics, possible data rates, available carrier bandwidths, and the like. Based on the determined frequency band, the criteria can be adjusted. For example, when it is determined that the signal comprises a 2.5 GHz frequency band, the criteria may be decreased to encourage the performance of a handover of wireless device 302 to access node 306, due to the smaller coverage area and higher communication rate relative to other frequency bands. As another example, when it is determined that the signal comprises a 800 MHz frequency band, the criteria may be increased, to raise the requirements for the performance of a handover of wireless device 302 to access node 308, due to the larger coverage area and relatively higher signal level at greater distances from access node 306 relative to other frequency bands. Other examples are also possible.

When the signal level of the second access node signal meets the criteria, the communication link is established between the first access node and the second access node (operation 414). For example, when the signal level of the signal from access node 306, which can be reported to access node 404 by wireless device 302, meets the criteria, communication link 318 can be established between access nodes 304 and 306. An indication of the new communication link can also be stored at access node 304, access node 306, controller node 308, gateway node 310, and/or another network element of communication system 300.

When the communication link is established between the first access node and the second access node, the performance of a handover of the wireless device from the first access node to the second access node is enabled (operation 416). For example, wireless device 302 can be instructed that it is permitted to request the performance of a handover when the communication link is established. The instruction can be provided by access node 304, controller node 308, gateway node 310, or another network element of communication system 300. Additionally, or alternatively, access node 304, controller node 308, and/or gateway node 310 can permit the performance of the handover. In an embodiment, the performance of a handover of the wireless device from the first access node to the second access node is prevented before the determining that the signal level of the second access node signal meets the criteria, and the performance of the handover of the wireless device from the first access node to the second access node is enabled when the communication link is established between the first access node and the second access node.

Then, when the communication link is established between the first access node and the second access node, a handover is performed of the wireless device from the first access node to the second access node. For example, when communication link 318 is established between access node 304 and access node 306, a performance of a handover of wireless device 302 can be performed from access node 304 to access node 306. The handover can comprise instructing wireless device 302 to change from communicating with access node 304 to communicating with access node 306, when wireless device 302 is conducting an active communication session with access node 304 (e.g., an application running on wireless device 302 is sending data to or receiving data from access node 304, an application running on wireless device 302 is participating in a voice communication session, and the like). The handover can further comprise cell reselection, for example, when wireless device 302 is in an idle mode or low power mode and moves from a coverage area of access node 304 to a coverage area of access node 306. Other examples are also possible, including combinations of the foregoing.

Figure 5:
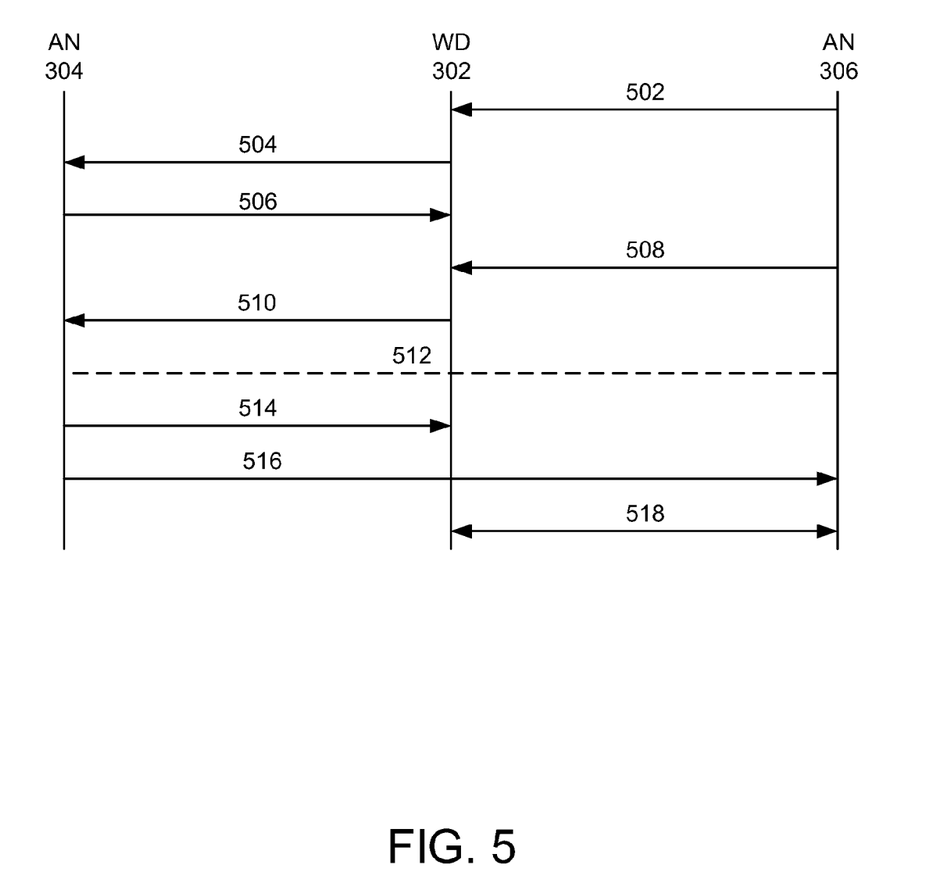
FIG. 5 illustrates an exemplary data flow diagram of neighbor access node determination.

FIG. 5 illustrates an exemplary data flow diagram of neighbor access node determination. When wireless device 302 detects second access node 306 (502), wireless device 302 sends an indication (504) to access node 304 that wireless device 302 has detected access node 306. The indication can comprise an identifier of access node 306, or some other indicator. The identifier of access node 306 can comprise a physical cell identifier (PCI) or another identifier.

The indication can be used to determine whether a communication link has been established between access nodes 304 and 306. The determination can be made, for example, at access node 304, controller node 308, gateway node 310, or another network element of a communication system. When it is determined that the communication link between access nodes 304 and 306 has not been previously established, access node 304 can initiate a process of neighbor discovery, such as an automatic neighbor relation (ANR) process, or a similar process of determining proximate or neighbor access nodes.

Wireless device 302 is then instructed (506) to provide additional information about access node 306. Instruction 506 can further comprise an instruction to decrease a reporting threshold, such as a signal level of a signal from access node 306. The additional information can comprise an identifier of access node 306 with more information than the PCI, such as a cell global identity (CGI), a E-UTRAN cell global identity (ECGI), and the like. The additional information can further comprise signal level information of a signal from access node 306. Instruction 506 can further comprise an instruction to wireless device 302 not to request a handover from access node 304 to access node 306, to prevent the performance of such a handover. Additionally, or alternatively, access node 304, controller node 308, and/or gateway node 310 can be instructed to prevent the performance of such a handover if a request to perform a handover of wireless device 302 to access node 306 is received, e.g., at access node 304 from wireless device 302, at controller node 308 and/or at gateway node 310 from access node 304, and the like. In an embodiment, instruction 506 can comprise a connection reconfiguration message, such as an RRC Connection Reconfiguration message.

The signal of access node 306 can comprise a reference signal, a pilot signal, a bearer signal, or some other signal, including combinations of the foregoing. The signal level can comprise an indication of signal strength, such as a reference signal receive power (RSRP), a received signal strength indication (RSSI), a signal-to-noise ratio (SNR), a carrier to noise ratio (CNR) value, a signal noise and distortion (SINAD), a signal to interference (SII), a signal to noise plus interference (SNIR), a signal to quantization noise ratio (SQNR), and the like. The signal level can further comprise an indication of signal quality, such as a reference signal receive quality (RSRQ), a channel quality indicator (CQI), or another measurement of signal quality.

The additional information (508) can be received at wireless device 302, and wireless device 302 can provide the additional information to access node 304 (510). The additional information about the second access node can be received from the wireless device in a handover request. That is, additional information about the second access node can be received from wireless device 302 in separate messages, or in some combination of messages. In an embodiment, additional information 510 can comprise a handover request from wireless device 302, which can comprise the signal level of the second access node and the detailed identifier information about the second access node to verify that the second access node is associated with the network provider of the first access node. Using the additional information, it can be determined that access node 306 is associated with the same network provider as access node 304, and that the signal level of the signal from access node 306 meets a criteria. In an embodiment, a frequency band of the signal from the second access node can be determined, and the criteria can be adjusted based on the determined frequency band. The frequency band can be determined, for example, based on the additional information from the second access node. The criteria can be adjusted to encourage or discourage the performance of a handover of wireless device 302 to access node 306.

When the signal level of the second access node signal meets the criteria, the communication link is established (512) between the first access node and the second access node. For example, when the signal level of the signal from access node 306, meets the criteria, communication link 318 can be established between access nodes 304 and 306. An indication of the new communication link can also be stored at access node 304, access node 306, controller node 308, gateway node 310, and/or another network element of communication system 300. The criteria can comprise a signal level threshold, such as a minimum signal strength indication, signal quality indication, or some combination thereof.

When the communication link is established between the first access node and the second access node, the performance of a handover of the wireless device from the first access node to the second access node can be enabled. For example, wireless device 302 can be instructed (514) that it is permitted to request the performance of a handover when the communication link is established. Additionally, or alternatively, instruction 514 can comprise a handover instruction to initiate a handover of wireless device 302 to access node 306. The instruction can be initiated by access node 304, controller node 308, gateway node 310, or another network element of communication system 300, and ultimately sent from access node 304 to wireless device 302. Access node 304 can also send a notification (516) to access node 306 of the initiation of the handover of wireless device 302. In an embodiment, while the performance of a handover of the wireless device from the first access node to the second access node is prevented before the determining that the signal level of the second access node signal meets the criteria, the performance of the handover of the wireless device from the first access node to the second access node is later enabled when the communication link is established between the first access node and the second access node.

The handover can comprise instructing wireless device 302 to change from communicating with access node 304 to communicating with access node 306, when wireless device 302 is conducting an active communication session with access node 304 (e.g., an application running on wireless device 302 is sending data to or receiving data from access node 304, an application running on wireless device 302 is participating in a voice communication session, and the like). The handover can further comprise cell reselection, for example, when wireless device 302 is in an idle mode or low power mode and moves from a coverage area of access node 304 to a coverage area of access node 306. Other examples are also possible, including combinations of the foregoing. Subsequently, communication (518) is established between wireless device 302 and access node 306.

Figure 6:
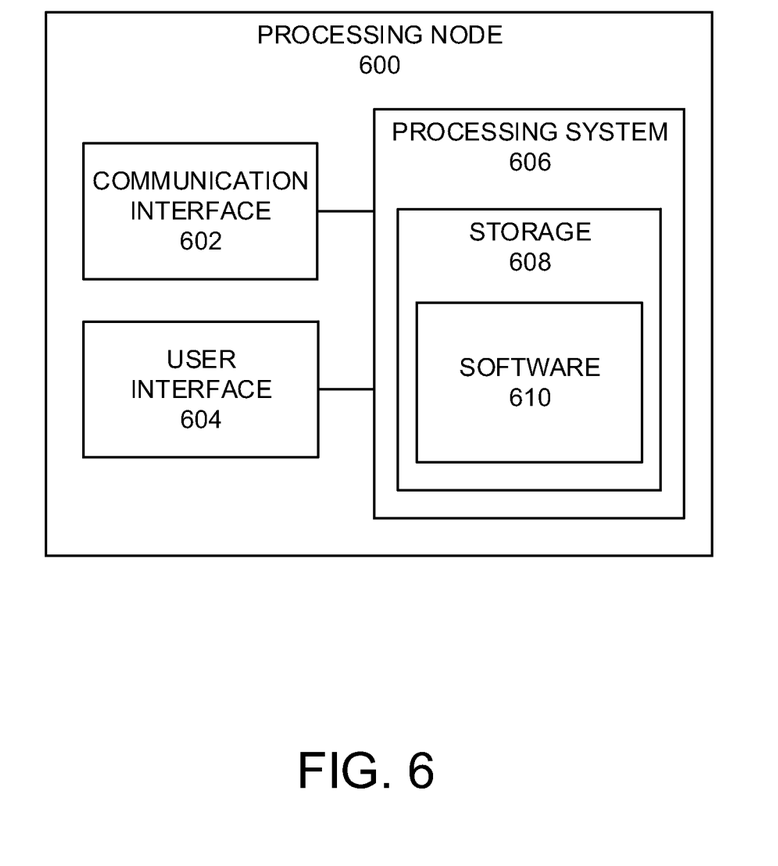
FIG. 6 illustrates an exemplary processing node.

FIG. 6 illustrates an exemplary processing node 600 in a communication system. Processing node 600 comprises communication interface 602, user interface 604, and processing system 606 in communication with communication interface 602 and user interface 604. Processing node 600 can be configured to determine a neighbor access node of an access node in a communication system. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include access nodes 104 and 106, access nodes 304 and 306, controller node 308, and gateway node 310. Processing node 600 can also be an adjunct or component of a network element, such as an element of access nodes 104 and 106, access nodes 304 and 306, controller node 308, and gateway node 310. Processing node 600 can also be another network element in a communication system. Further, the functionality of processing node 600 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method of neighbor access node determination, comprising:
   receiving from a wireless device in communication with a first access node an identifier of a second access node detected by the wireless device;
   determining, based on the identifier, that a communication link has not previously been established between the first access node and the second access node;
   when the communication link between the first access node and the second access node has not been established, instructing the wireless device to provide information about the second access node to verify that the second access node is associated with a network provider of the first access node and instructing the wireless device to provide a signal level of a signal from the second access node;
   verifying, at the first access node, that the second access node is associated with the network provider of the first access node and that the signal level of the second access node meets a reporting threshold;
   establishing the communication link between the first access node and the second access node when the network provider of the second access node is verified and when the signal level of the second access node meets the reporting threshold; and
   enabling the performance of a handover of the wireless device from the first access node to the second access node.

2. The method of claim 1, further comprising:
   preventing the performance of the handover of the wireless device from the first access node to the second access node before the determining that the signal level of the second access node signal meets the reporting threshold; and
   enabling the performance of the handover of the wireless device from the first access node to the second access node when the communication link is established between the first access node and the second access node.

3. The method of claim 1, further comprising:
   receiving from the wireless device the identifier of the second access node when the signal level of the signal from the second access node received at the wireless device is greater than a signal level of a signal from the first access node received at the wireless device.

4. The method of claim 1, further comprising:

determining a frequency band of the signal from the second access node; and adjusting the reporting threshold based on the determined frequency band.

5. The method of claim 1, further comprising:

instructing the wireless device with a connection reconfiguration message to decrease the reporting threshold; and receiving from the wireless device information about the second access node to verify that the second access node is associated with a network provider of the first access node and the signal level of the signal from the second access node when the signal level from the second access node meets the decreased reporting threshold.

6. The method of claim 1, further comprising:

receiving from the wireless device a handover request comprising the signal level of the second access node and the information about the second access node to verify that the second access node is associated with the network provider of the first access node.

7. The method of claim 1, further comprising:

performing a handover of the wireless device from the first access node to the second access node when the communication link is established between the first access node and the second access node.

8. A system for neighbor access node determination, comprising:

a processing node, configured to receive from a wireless device in communication with a first access node an identifier of a second access node detected by the wireless device;

determine, based on the identifier, that a communication link has not previously been established between the first access node and the second access node;

when the communication link between the first access node and the second access node has not been established, instruct the wireless device to provide information about the second access node to verify that the second access node is associated with a network provider of the first access node and instruct the wireless device to provide a signal level of a signal from the second access node;

verify, at the first access node, that the second access node is associated with the network provider of the first access node and that the signal level of the second access node meets a reporting threshold;

establish the communication link between the first access node and the second access node when the network provider of the second access node is verified and when the signal level of the second access node meets the reporting threshold; and enable the performance of a handover of the wireless device from the first access node to the second access node.

9. The system of claim 8, wherein the processing node is further configured to:

prevent the performance of the handover of the wireless device from the first access node to the second access node before the determining that the signal level of the second access node signal meets the reporting threshold; and enable the performance of the handover of the wireless device from the first access node to the second access node when the communication link is established between the first access node and the second access node.

10. The system of claim 8, wherein the processing node is further configured to:

receive from the wireless device the identifier of the second access node when the signal level of the signal from the second access node received at the wireless device is greater than a signal level of a signal from the first access node received at the wireless device.

11. The system of claim 8, wherein the processing node is further configured to:

determine a frequency band of the signal from the second access node; and adjust the reporting threshold based on the determined frequency band.

12. The system of claim 8, wherein the processing node is further configured to:

instruct the wireless device with a connection reconfiguration message to decrease the reporting threshold; and receive from the wireless device information about the second access node to verify that the second access node is associated with a network provider of the first access node and the signal level of the signal from the second access node when the signal level from the second access node meets the decreased reporting threshold.

13. The system of claim 8, wherein the processing node is further configured to:

receive from the wireless device a handover request comprising the signal level of the second access node and the information about the second access node to verify that the second access node is associated with the network provider of the first access node.

14. The system of claim 8, wherein the processing node is further configured to:

perform a handover of the wireless device from the first access node to the second access node when the communication link is established between the first access node and the second access node.

* * * * *